(12) United States Patent
Campbell

(10) Patent No.: US 6,917,948 B2
(45) Date of Patent: Jul. 12, 2005

(54) SYSTEMS AND METHODS FOR PROVIDING ELECTRONIC ARCHIVING

(75) Inventor: Leo J. Campbell, Arlington, VA (US)

(73) Assignee: United States Postal Service, Washington, DC (US)

( * ) Notice: Subject to any disclaimer, the term of this patent is extended or adjusted under 35 U.S.C. 154(b) by 98 days.

(21) Appl. No.: 10/362,506

(22) PCT Filed: Sep. 7, 2001

(86) PCT No.: PCT/US01/27690

§ 371 (c)(1),
(2), (4) Date: Feb. 24, 2003

(87) PCT Pub. No.: WO02/21315

PCT Pub. Date: Mar. 14, 2002

(65) Prior Publication Data

US 2004/0128316 A1 Jul. 1, 2004

Related U.S. Application Data

(60) Provisional application No. 60/231,337, filed on Sep. 8, 2000.

(51) Int. Cl.[7] .............................................. G06F 17/00
(52) U.S. Cl. ..................... 707/104.1; 707/102; 707/200
(58) Field of Search ............................. 707/100–104.1, 707/3–6, 200–205

(56) References Cited

U.S. PATENT DOCUMENTS

| | | | |
|---|---|---|---|
| 5,857,188 A | | 1/1999 | Douglas |
| 5,878,233 A | | 3/1999 | Schloss |
| 6,064,995 A | * | 5/2000 | Sansone et al. .......... 707/104.1 |
| 6,219,669 B1 | * | 4/2001 | Haff et al. ..................... 707/10 |
| 6,442,571 B1 | * | 8/2002 | Haff et al. ................... 707/201 |

OTHER PUBLICATIONS

Czerny, Customer account management system for STEWEAG key accounts, Electricity Distribution, Par 1, Contributions, 14th International Conference and Exhibition (IEE conf. Publ. No. 438), vol. 5, 1997, pp. 6/1–6/5.*
Stafford et al., Delivering marketing expertise to the front lines, Expert, IEEE, vol. 9, Issue 2, 1994, pp. 23–32.*
Bhushan et al., Federated accounting: service charging and billing in a business–to–business environment, Integrated Network Management Proceedings, 2001 IEEE/IFIP International Symposium on, May 14–18 2001, pp. 107–121.*
Security of digital signature with one–time pair of keys [comment]Yuh–Min Tseng; Jinn–Ke Jan; Hung–Yu Chien; Electronics Letters, vol. 36, Issue: 16, Aug. 3, 2000.*
S–ARP: a secure address resolution protocol Bruchi, D.; Ornaghi, A.; Rosti, E.; Computer Security Applications Conference, 2003, Proceedings. 19th Annual, Dec. 8–12, 2003.*
Construction of a policy of safety in CA structures Efimov, I.N.; Kozub, A.A.; Kiseleva, I.A.; Electron Devices and Materials, 2004. Proceedings 5th Annual. 2004 International Siberian Workshop on, Jul. 1–5, 2004.*

* cited by examiner

Primary Examiner—David Jung
(74) Attorney, Agent, or Firm—Finnegan, Henderson, Farabow, Garrett & Dunner, LLP

(57) ABSTRACT

Systems and methods are disclosed for providing secure electronic archiving of customer (120) data over a network (110). Electronic postmarks are used to track archival of the data, access request for the archived (101) data, and fulfillment of the access requests.

52 Claims, 6 Drawing Sheets

SYSTEMS AND METHODS FOR PROVIDING ELECTRONIC ARCHIVING

CROSS REFERENCE TO RELATED APPLICATION

This application claims priority from U.S. Provisional Application Ser. No. 60/231,337, filed Sep. 8, 2000, by Leo J. Campbell and titled SYSTEMS AND METHODS FOR PROVIDING ELECTRONIC ARCHIVING, the disclosure of which is expressly incorporated herein by reference.

DESCRIPTION OF THE INVENTION

1. Field of the Invention

This invention relates to providing secure electronic archiving of customer data over a network. In addition, this invention relates to processing requests for the access of the electronic information to a customer or a third party specified by the customer.

2. Background of the Invention

Current electronic archive systems provide for the long-term storage of electronic files. Typically such systems require specialized software and/or are incorporated in document management software packages, such as DocuXplorer by Archive Power Systems, Inc. One known system for providing archival and retrieval of electronic messages, such as emails and their attachments, is ZANTAZ, by Zantaz, Inc. What is needed is a secure archive system for archival and retrieval of customer data files by incorporating secure customer identification through the use of digital certificates, and by utilizing electronic postmarks ("EPMs") to store customer data and to facilitate tracking of customer data. What is also needed is a secure archive system that is independent of customer hardware and software platforms.

SUMMARY OF THE INVENTION

The present invention provides an archive system that customers may access through a browser over a network using secure communication transmissions, and using electronic postmarks ("EPMs") to facilitate tracking of customer data. An EPM is a time-stamped and cryptographically sealed digital hash that accompanies an electronic message, to detect modification of the latter. The EPM for a message may include a time and date stamp indicating when the EPM was generated. The contents of an EPM are digitally "sealed" by the addition of a digital signature. An exemplary EPM is described in U.S. Ser. No. 09/675,677, filed Sep. 29, 2000, by Leo J. Campbell et al. and titled "Systems and Methods for Authenticating an Electronic Message," the disclosure of which is expressly incorporated herein by reference to its entirety. In addition, an embodiment of the invention provides an archive system that is independent of customer hardware and software platforms.

More specifically, and in accordance with an embodiment of the invention, systems and methods are disclosed for providing customer accessible archiving of electronic files. Such systems and methods provide for establishing an account for a customer; receiving from the customer a storage request for archiving, wherein the storage request includes the electronic file and customer identification information; creating a storage EPM corresponding to the storage request; and storing the electronic file together with the storage EPM.

In accordance with another embodiment of the invention, systems and methods are disclosed for providing a customer access to the electronic files in an archive, wherein the electronic file is stored with a storage EPM. Such systems and methods receive an access request from the customer for the electronic file, wherein the access request includes the customer identification information and information identifying the electronic file in the archive; verify that the customer may access the electronic file based on the customer identification information and the information identifying the electronic file in the archive; retrieve the stored electronic file from the archive; and provide the retrieved electronic file to the customer.

In accordance with yet another embodiment of the invention, systems and methods are disclosed for providing access to an electronic file in an archive to a third party, wherein the electronic file is stored with a storage EPM. Such systems and methods provide for receiving from a customer a link request to permit access of the electronic file by the third party, wherein the link request includes information identifying the electronic file in the archive, customer identification information including the customer's digital certificate, and the third party's digital certificate; authenticating the customer based on the customer identification information; linking the customer's digital certificate to the third party's digital certificate, when the customer has been authenticated; receiving an access request from the third party, wherein the access request includes identification information about the third party and the information identifying the electronic file in the archive; verifying that the third party may access the electronic file based on identification information about the third party; retrieving the electronic file from the archive; and providing the retrieved electronic file to the third party.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the exemplary embodiments consistent with the invention, examples of which are illustrated in the accompanying drawings. Wherever possible, the same reference numbers will be used throughout the drawings to refer to the same or like parts.

Figure 1:
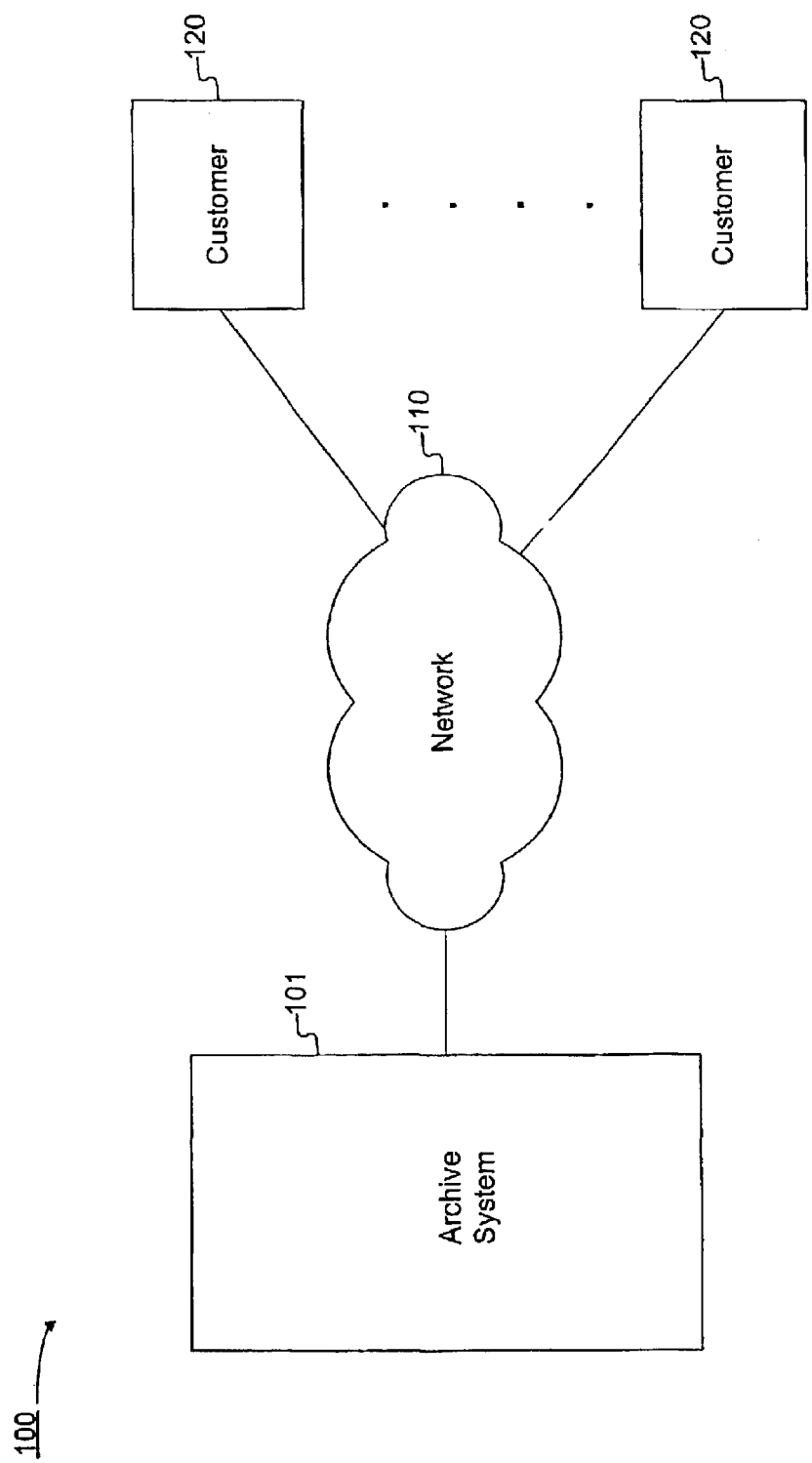
FIG. 1 is a block diagram of a networked system including an archive system consistent with the present invention.

FIG. 1 is a block diagram of a networked system 100 for providing archive services to customers. System 100 may include one or more archive systems 101 connected to a plurality of customer systems 120 through a network 110. Network 110 may include, for example, a Local Area Network (LAN), a Wide Area Network (WAN), a wireless network, the Internet, an intranet, and/or any other network or communication medium known to one of ordinary skill in the relevant art. Communications between archive system 101 and customer systems 120 may take place over network 110 through a secure sockets layer ("SSL") protocol or secure HyperText Transfer Protocol ("S-HTTP").

Figure 2:
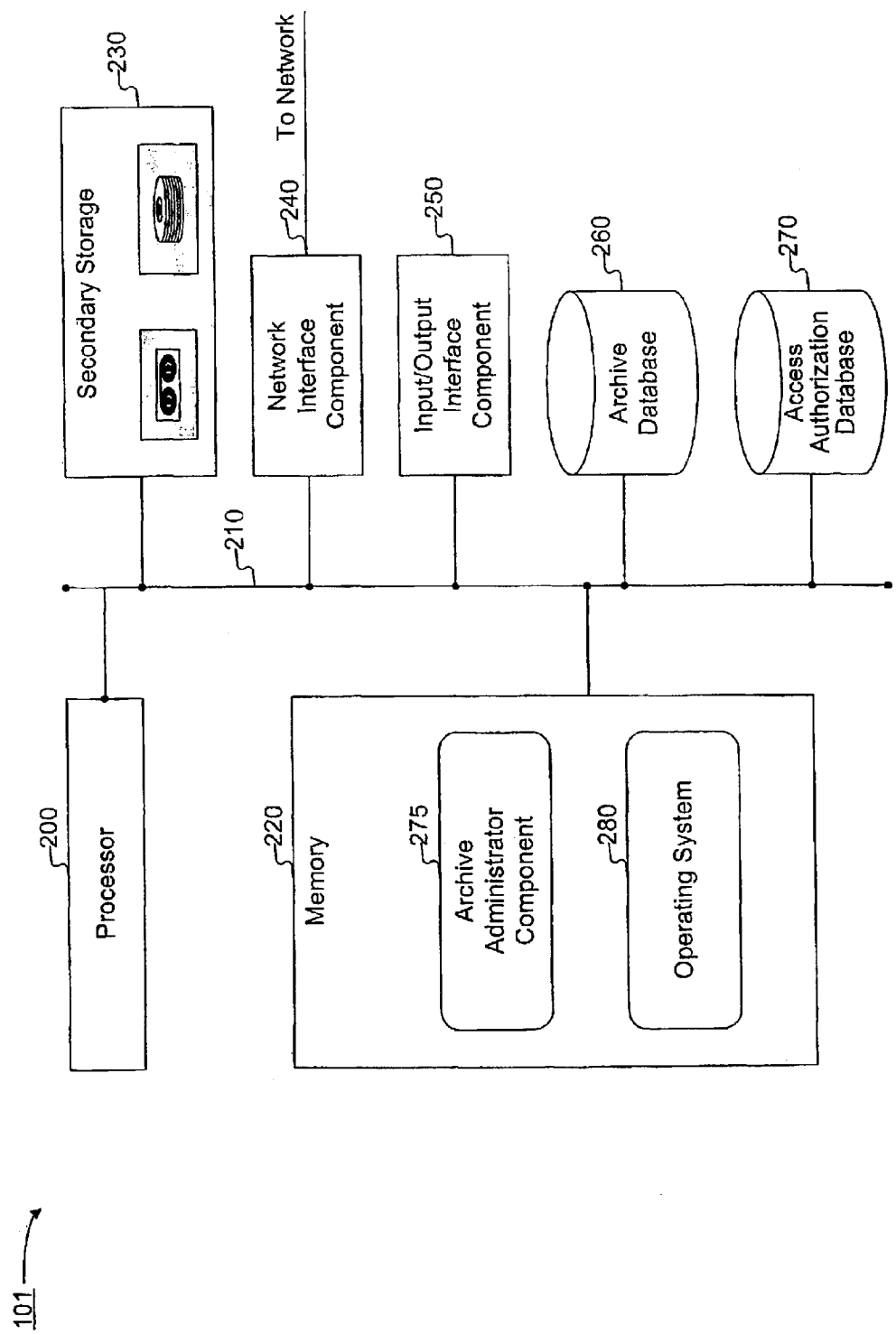
FIG. 2 is an expanded block diagram of archive system of FIG. 1.

FIG. 2 is a block diagram of an archive system 101 consistent with the present invention. Archive system 101 may include a processor 200, which connects over bus 210 to a memory 220, a secondary storage 230, a network interface component 240, an input/output interface component 250, an archive database 260, and an authorization database 270. Memory 220 may include an archive administrator component 275 and an operating system 280. Alternatively archive database 260 and authorization database 270 may be combined into a single database.

Operation of archive system 101 is generally controlled and coordinated by operating system 280. Operating system 280 controls allocation of system resources and performs tasks, such as memory management, process scheduling, networking, and services, among other things.

Secondary storage 230 may include a computer-readable medium, such as a hard disk drive and a compact disc ("CD") drive or a read/write CD drive. From the CD drive or the read/write CD drive, software and data may be loaded onto the disk drive, which may then be copied into memory 220. Similarly, software and data in memory 220 may be copied onto the hard disk drive, which may then be loaded onto a read/write CD drive.

Network interface component 240 may include hardware and software for sending and receiving data over network 110 (see FIG. 1). Archive system 101 may communicate with one or more customer systems 120 over network 110 through network interface component 240.

Input/Output interface component 250 may include one or more of, a keyboard, a pointing device, a voice recognition device, a keypad, display unit, or a printing device. Archive database 260 may include one or more databases and/or data files for the storage of data relating to customers 120. Authorization database 270 may include one or more databases and/or data files for storing information about customer archival transactions.

Figure 3:
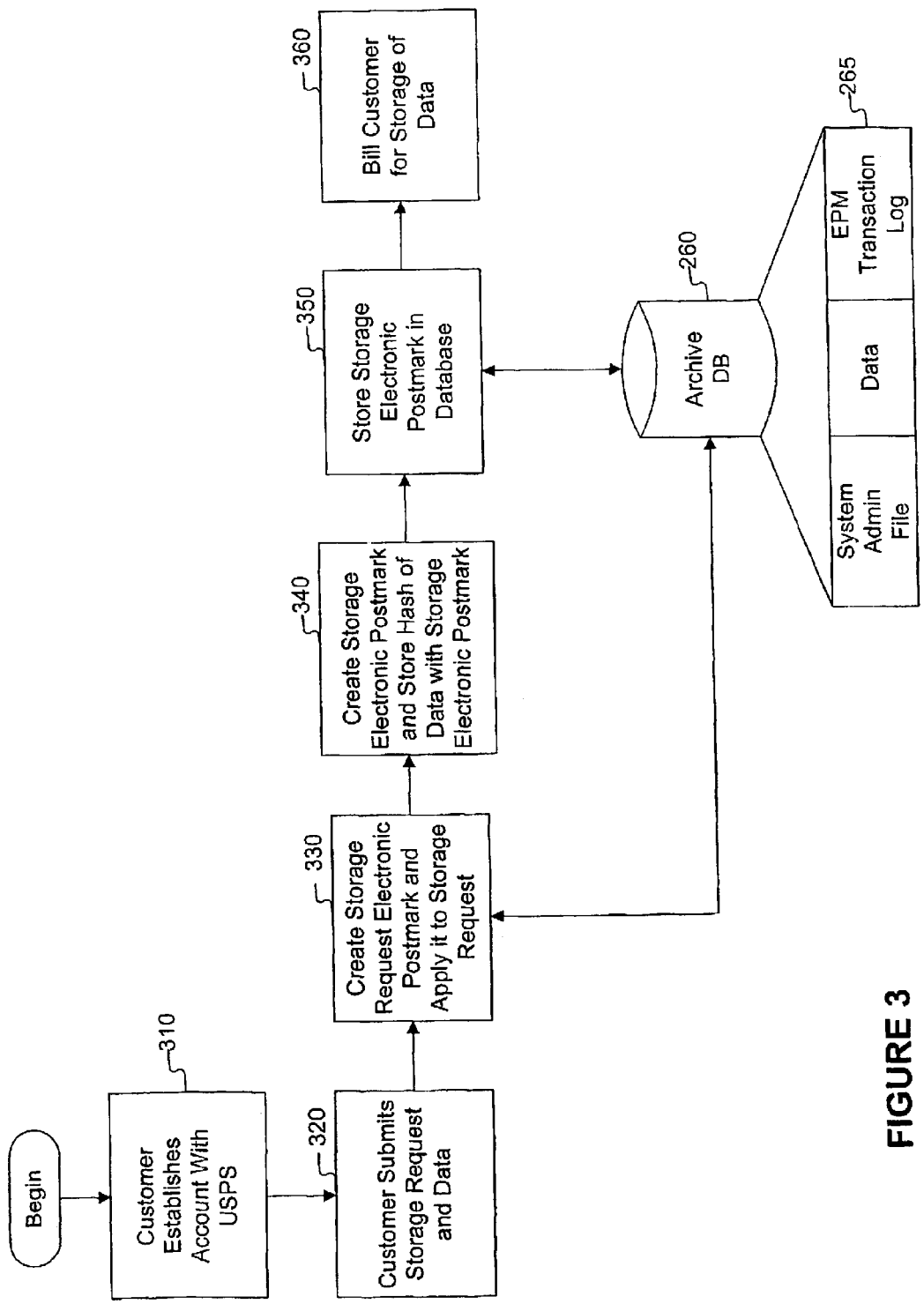
FIG. 3 is a flowchart showing a method for archiving electronic data consistent with the present invention.

FIG. 3 is a flowchart showing a method for archiving electronic data. The electronic data may include, for example, an electronic file. As shown in FIG. 3, a customer 120 may use a browser, such as the Microsoft Internet Explorer or a SUPER Browser, to access a web page on an archive system 101 to establish an account with an archive administrator over network 110 (stage 310). An exemplary SUPER Browser is described in U.S. Ser. No. 60/294,001, filed May 30, 2001, by Leo J. Campbell and titled "Secure Universal Postal Encrypted Resource (SUPER) Browser," the entire disclosure of which is expressly incorporated herein by reference. An archive administrator may include, for example, the United States Postal Service ("USPS").

With reference to FIGS. 1 and 2, archive administrator component 275 may receive identification information from customer 120, for example, a username, password, company, email address, physical address, etc. Archive administrator component 275 determines based on the identification information, whether customer 120 has a digital certificate of authority ("digital certificate"). If customer 120 does not have a digital certificate, archive administrator component 275 generates a digital certificate for customer 120 and sends it to customer 120 over network 110. Archive administrator component 275 may store identification information including information about digital certificates for customers 120 in an access authorization database 270. The identification information may be used to link access authorization database 270 with archive database 260. Archive administrator component 275 may be implemented in any computer programming language or software tool, such as C++, C, Java, Hypertext Markup Language ("HTML"), Visual Basic, etc.

A digital certificate may be used to uniquely identify a customer and to provide authorization to a customer for access of electronic information, such as an archived electronic file. An exemplary digital certificate of authority is described in U.S. Ser. No. 09/809,325, filed Mar. 16, 2001, by Leo J. Campbell et al. and titled "Methods and Systems for Proofing Identities Using a Certificate Authority," the entire disclosure of which is expressly incorporated herein by reference. For example, the USPS provides a public key infrastructure, which includes, among other things, the generation of digital certificates.

Returning to FIG. 3, once a customer 120 has an account, the customer may submit to archive system 101 over network 110, a storage request for archiving data (stage 320). The storage request includes an electronic file that may include a record, data, a database, a compressed file, a music file, etc. In addition, the storage request includes customer identification information, such as a digital certificate and optionally a name and password. Archive administrator component 275 creates a storage request EPM and applies it to the storage request by generating a storage request record for the transaction in transaction log 265 in archive database 260 (stage 330). The storage request EPM may be used to track the archival of the electronic file. A storage request EPM may include the time and date of the request, and customer identification information, allowing archive system 101 to keep track of storage request transactions. Thereafter, archive administrator component 275 creates a storage EPM 370 based on the electronic file.

Figure 3A:
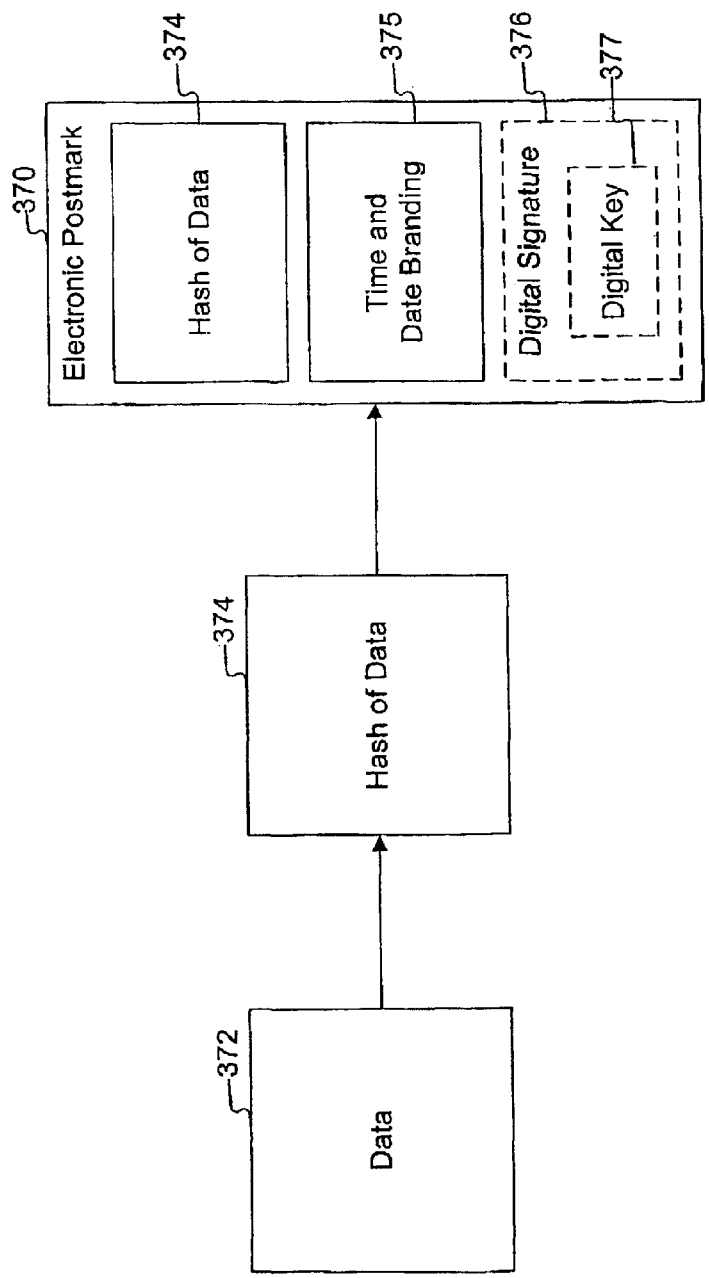
FIG. 3A is a block diagram of a storage EPM consistent with the present invention.

As shown in FIG. 3A, archive administrator component 275 creates the storage EPM 370 by generating a hash file 374 from the electronic file 372, and storing the hash file 374 in storage EPM 370 (stage 340). Archive administrator component 275 may generate hash file 374 using known hashing techniques, such as a Secure Hash Algorithm ("SHA-1), a technique based on an algorithm provided by Rivest, Shamir, and Adelman ("RSA"), and a Message Digest algorithm ("MD5"). Archive administrator component 275 also stores in storage EPM 370 a time and date stamp 375 to indicate the time and date of the storage of the electronic file. In addition, archive administrator component 275 may store in storage EPM 370 a digital signature 376 having a digital key 377 for digitally securing the storage EPM 370. Further, archive administrator component 275 may store customer identification information in storage EPM 370.

Thereafter, as shown in FIG. 3, archive administrator component 275 stores the storage EPM 370 in archive database 260 (stage 350). Archive database 260 may include tables for storing storage EPMs, logs for EPM transactions, and archive administrator system files. At this point, archive administrator component 275 may bill customer 120 for storage of the electronic file (stage 360). The electronic file may remain in storage for a length of time that is determined by customer 120.

Figure 4:
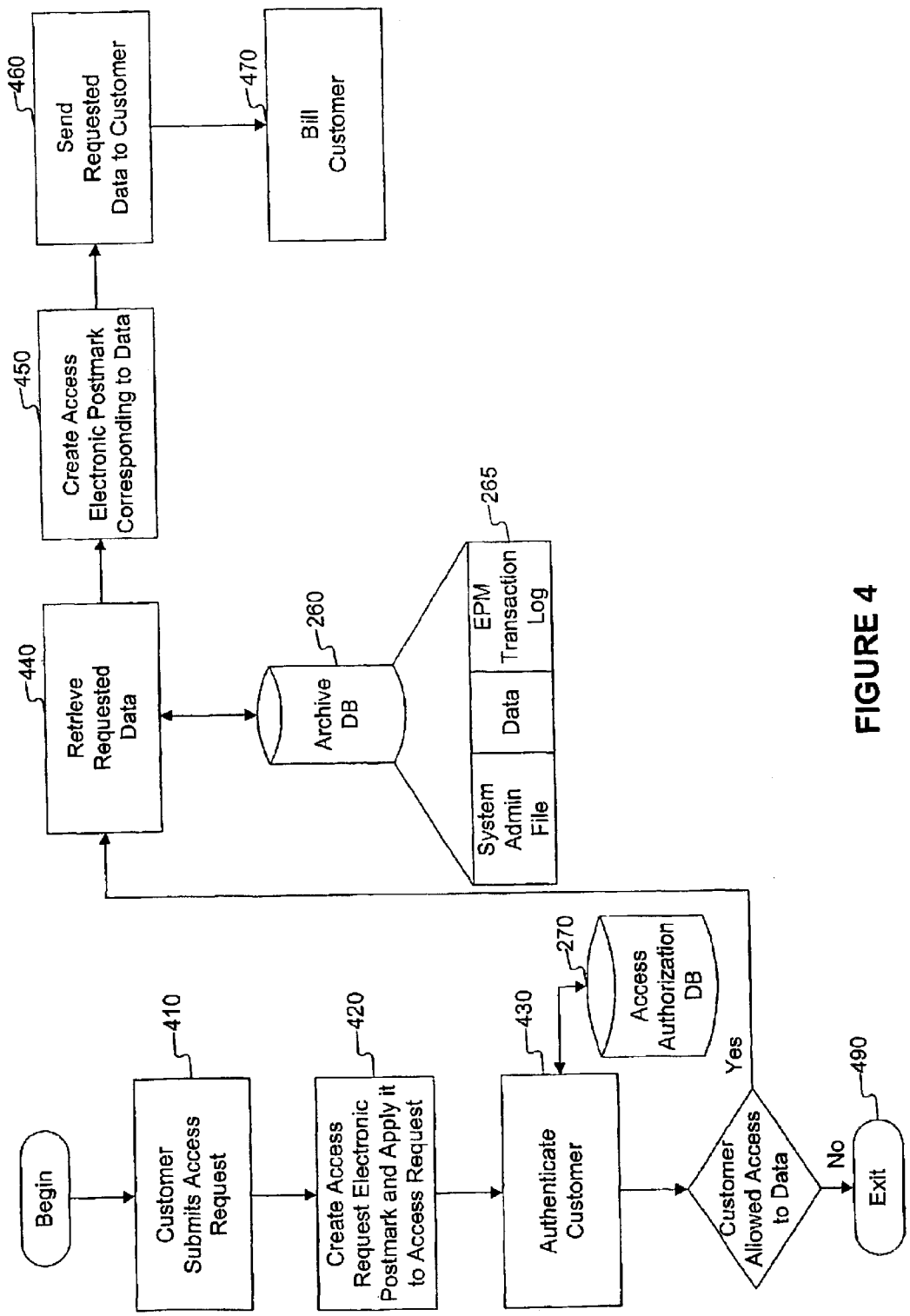
FIG. 4 is a flowchart showing a method for retrieving archived data by a customer consistent with the present invention.

FIG. 4 is a flowchart showing a method for retrieving archived data by a customer. As shown in FIG. 4, a customer 120 may submit to archive system 101 over network 110 an access request for an archived electronic file (stage 410). The access request includes information identifying the archived electronic file and customer identification information, such as a digital certificate and optionally a name and password. The information identifying the archived electronic file may include, for example, a filename for the electronic file. Archive administrator component 275 creates an access request EPM based on the customer identification information, and applies it to the access request by generating a record for the transaction in transaction log 265 in archive database 260 (stage 420). The access request EPM may be used to track access requests for the archived electronic file and may include the time and date of the access request, and customer identification information.

Archive administrator component 275 then verifies whether customer 120 is allowed to access the archived electronic file, using information in authorization database 270, customer identification information, and information identifying the archived electronic file (stage 430). If customer 120 is not allowed access to the archived electronic file ("No"), archive administrator component 275 may send an appropriate message to customer 120 and terminates the transaction (stage 490). Otherwise ("Yes"), archive administrator component 275 retrieves a copy of the archived electronic file from archive database 260 (stage 440). More specifically, archive administrator component 275 retrieves the storage EPM 370 from archive database 260 based on the customer identification information and the information identifying the archived electronic file. Next, archive administrator component 275 retrieves the archived electronic file from the hash of data 374 in the storage EPM 370.

In addition, archive administrator component 275 creates an access EPM and applies it to the archived electronic file by generating a record for the transaction in a transaction log 265 in the archive database 260 (stage 450). An access EPM includes the time and date on which the access request was processed by the archive system 101.

Thereafter, archive administrator component 275 provides customer 120 access to the electronic file by sending the copy of the electronic file to customer 120 over network 110 (stage 460). Alternatively, archive administrator component 275 may send the electronic file to a file server, and send the location of the electronic file at the file server to customer 120. In addition, archive administrator component 275 may bill customer 120 for access of the archived electronic file (stage 470). Customer 120 may make changes to the electronic file, and may request the revised electronic file be archived by archive system 101.

Figure 5:
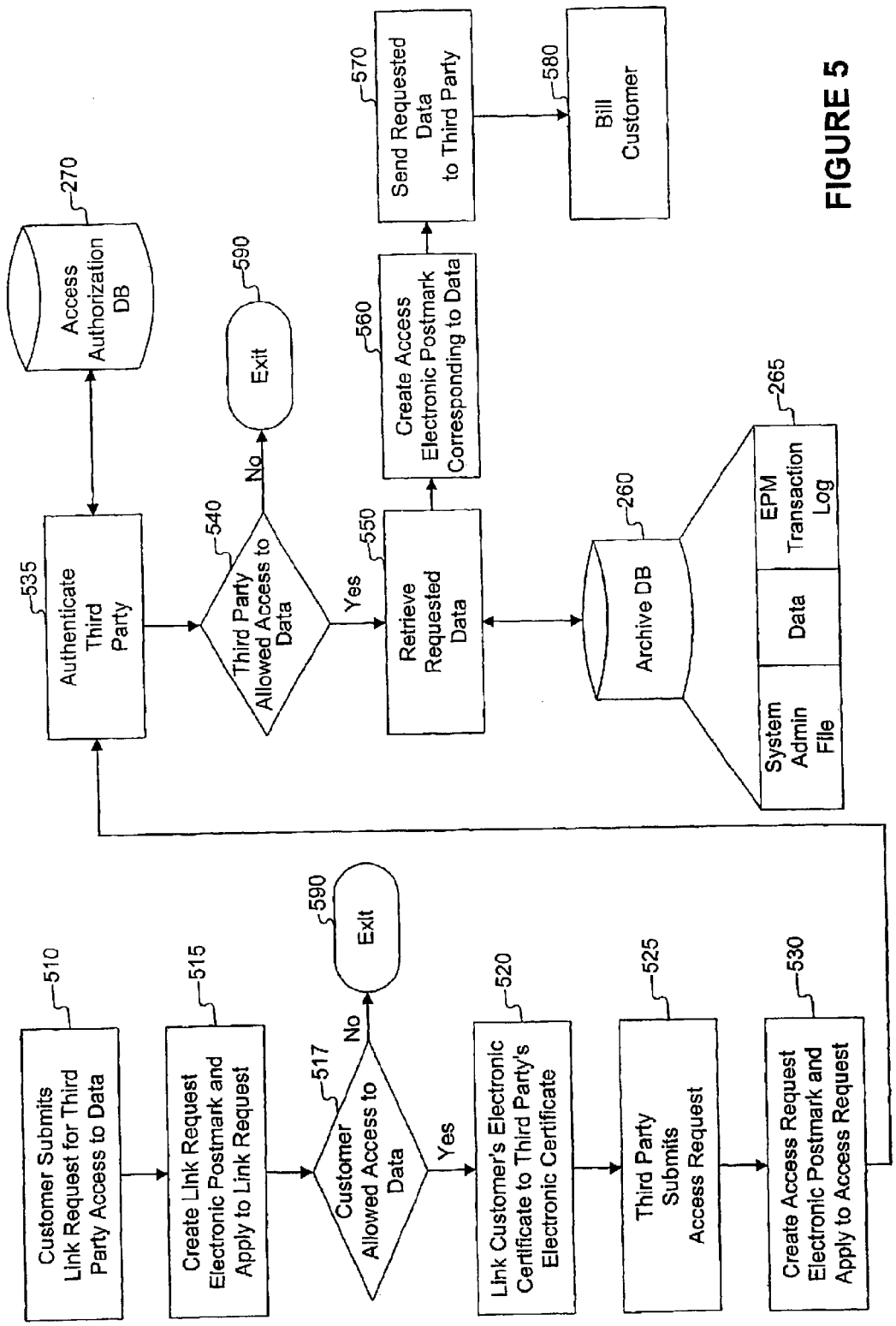
FIG. 5 is a flowchart showing a method for retrieving archived data by a third party consistent with the present invention.

FIG. 5 is a flowchart showing a method for retrieving archived data by a third party. Sometime during the life of the storage of the electronic file, a third party may wish to access customer 120 information in archive system 101. A customer 120 may share with a third party the customer's access privileges for one or more electronic files through the use of digital certificates. An authorized third party's digital certificate may be linked to the customer's digital certificate, thereby giving the third party access into the electronic archive system 101 for one or more archived electronic files specified by customer 120.

As shown in FIG. 5, a customer 120 may submit to the archive system 101 over network 110 a link request to permit a third party to access an archived electronic file to which customer 120 has access (stage 510). The link request may include information identifying the archived electronic file, customer identification information, such as a digital certificate and optionally a name and password, and a third party's digital certificate. The information identifying the archived electronic file may include, for example, a filename for the electronic file. Archive administrator component 275 creates a link request EPM and applies it to the link request by generating a record for the transaction in transaction log 265 in archive database 260 (stage 515). A link request EPM may include the time and date of the link request, the information identifying the archived electronic file, the customer identification information, and information about the third party's digital certificate.

Archive administrator component 275 verifies that customer 120 is allowed to access the archived electronic file, using information in authorization database 270 and the customer identification information (stage 517). If customer 120 is not allowed access to the archived electronic file ("No"), archive administrator component 275 sends an appropriate message to customer 120 and terminates the transaction (stage 590). Otherwise ("Yes"), archive administrator component 275 links the customer's digital certificate to the third party's digital certificate for access to the archived electronic file (stage 520). In addition, archive administrator component 275 creates a link EPM and applies it to the archived electronic file by generating a record for the transaction in transaction log 265 in archive database 260. A link EPM may include the time and date on which the customer's digital certificate was electronically linked to the third party's digital certificate, information about the third party's digital certificate, and an index link to the storage EPM that includes the electronic file.

Thereafter, the third party may submit to the archive system 101 over network 110 an access request for the archived electronic file, the access request including information identifying the archived electronic file, and identification information about the third party, such as the third party's digital certificate and optionally a name and password (stage 525). The information identifying the archived electronic file may include, for example, a filename for the electronic file. Archive administrator component 275 creates an access request EPM and applies it to the access request by generating a record for the transaction in transaction log 265 in archive database 260 (stage 530). The access request EPM may be used to track access requests for the archived electronic file. An access request EPM may include the time and date of the access request and identification information about the third party, allowing archive system 101 to keep track of access request transactions.

Archive administrator component 275 verifies that the third party is allowed to access the archived electronic file (stage 535). Archive administrator component 275 may determine whether the third party is allowed access to the archived electronic file based on information in the authorization database 270 and the identification information about the third party (stage 540). If the third party is not allowed access to the electronic file ("No"), archive administrator component 275 sends an appropriate message to the third party and terminates the transaction (stage 590). Otherwise ("Yes"), archive administrator component 275 retrieves a copy of the archived electronic file from archive database 260 (stage 550). More specifically, archive administrator component 275 retrieves the storage EPM 370 from archive database 260 based on the third party identification information and the information identifying the archived electronic file. Next, archive administrator component 275 retrieves the archived electronic file from the hash of data 374 in the storage EPM 370.

In addition, archive administrator component 275 creates an access EPM and applies it to the archived electronic file by generating a record for the transaction in transaction log 265 in archive database 260 (stage 560). An access EPM includes the time and date on which the access request was processed by the archive system 101, allowing archive system 101 to keep track of information about the access of the archived electronic file.

Thereafter, archive administrator component 275 allows the third party to access the electronic file by sending the copy of the electronic file to the third party over network 110 (stage 570). Alternatively, archive administrator component 275 may send the electronic file to a file server, and send the location of the electronic file at the file server to the third party. In addition, archive administrator component 275 may bill customer 120 for access of the electronic file (stage 580). The third party may make changes to the electronic file, and customer 120 may request the revised electronic file be archived by archive system 101.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing secure archiving of an electronic file, comprising:
   establishing an account for a customer;
   receiving from the customer a storage request for archiving, wherein the storage request includes the electronic file and customer identification information;
   creating a storage electronic postmark corresponding to the storage request, wherein the storage electronic postmark includes the electronic file; and
   storing the electronic file together with the storage electronic postmark in a database.

2. The method of claim 1, wherein the storage electronic postmark includes the customer identification information.

3. The method of claim 2, wherein the customer identification information includes a digital certificate.

4. The method of claim 3, wherein the customer identification information further includes a name and password.

5. The method of claim 1, further comprising:
   creating a storage request electronic postmark corresponding to the storage request, wherein the storage request electronic postmark includes the customer identification information; and
   storing the storage request electronic postmark in the database.

6. A system for providing secure archiving of an electronic file, comprising:
   means for establishing an account for a customer;
   means for receiving from the customer a storage request for archiving, wherein the storage request includes the electronic file and customer identification information;
   means for creating a storage electronic postmark corresponding to the storage request, wherein the storage electronic postmark includes the electronic file; and
   means for storing the electronic file together with the storage electronic postmark in a database.

7. The system of claim 6, further comprising:
   means for creating a storage request electronic postmark corresponding to the storage request, wherein the storage request electronic postmark includes the customer identification information; and
   means for storing the storage request electronic postmark in the database.

8. A system for providing secure archiving of an electronic file, comprising:
   a component for establishing an account for a customer;
   a component for receiving from the customer a storage request for archiving, wherein the storage request includes the electronic file and customer identification information;
   a component for creating a storage electronic postmark corresponding to the storage request, wherein the storage electronic postmark includes the electronic file; and
   a component for storing the electronic file together with the storage electronic postmark in a database.

9. The system of claim 8, further comprising:
   a component for creating a storage request electronic postmark corresponding to the storage request, wherein the storage request electronic postmark includes the customer identification information; and
   a component for storing the storage request electronic postmark in the database.

10. A method for providing access to a secured electronic file to a customer, the method comprising:
    providing a database wherein the electronic file and customer identification information are stored with a storage electronic postmark;
    receiving an access request from the customer for the electronic file, wherein the access request includes the customer identification information and information identifying the electronic file in the database;
    verifying that the customer is allowed to access the electronic file based on the customer identification information and the information identifying the electronic file in the database;
    retrieving the stored electronic file from the database; and
    providing the retrieved electronic file to the customer.

11. The method of claim 10, wherein the customer identification information includes a digital certificate.

12. The method of claim 11, wherein the customer identification information further includes a name and password.

13. The method of claim 10, further comprising:
    creating an access request electronic postmark corresponding to the access request, wherein the access request electronic postmark includes the customer identification information; and
    storing the access request electronic postmark in the database.

14. The method of claim 10, further comprising:
    creating an access electronic postmark; and
    storing the access electronic postmark in the database.

15. The method of claim 10, wherein the information identifying the electronic file in the database includes a filename.

16. The method of claim 10, wherein the step of retrieving the stored electronic file from the database comprises:
    extracting the stored electronic file from the storage electronic postmark.

17. A system for providing access to a secured electronic file to a customer, the system comprising:
    means for providing a database wherein the electronic file and customer identification information are stored with a storage electronic postmark;
    means for receiving an access request from the customer for the electronic file, wherein the access request includes the customer identification information and information identifying the electronic file in the database;

means for verifying that the customer may access the electronic file based on the customer identification information and the information identifying the electronic file in the database;

means for retrieving the stored electronic file from the database; and means for providing the retrieved electronic file to the customer.

18. The system of claim 17, further comprising:

means for creating an access request electronic postmark corresponding to the access request, wherein the access request electronic postmark includes the customer identification information; and means for storing the access request electronic postmark in the database.

19. The system of claim 17, further comprising:

means for creating an access electronic postmark; and means for storing the access electronic postmark in the database.

20. The system of claim 17, wherein the means for retrieving the stored electronic file from the database comprises:

means for extracting the stored electronic file from the storage electronic postmark.

21. A system for providing access to a secured electronic file to a customer, the system comprising:

a component for providing a database wherein the electronic file and customer identification information are stored with a storage electronic postmark;

a component for receiving an access request from the customer for the electronic file, wherein the access request includes the customer identification information and information identifying the electronic file in the database;

a component for verifying that the customer may access the electronic file based on the customer identification information and the information identifying the electronic file in the database;

a component for retrieving the stored electronic file from the database; and a component for providing the retrieved electronic file to the customer.

22. The system of claim 21, further comprising:

a component for creating an access request electronic postmark corresponding to the access request, wherein the access request electronic postmark includes the customer identification information; and a component for storing the access request electronic postmark in the database.

23. The system of claim 21, further comprising:

a component for creating an access electronic postmark; and a component for storing the access electronic postmark in the database.

24. The system of claim 21, wherein the component for retrieving the stored electronic file from the database comprises:

a component for extracting the stored electronic file from the storage electronic postmark.

25. A method for providing access to a secured electronic file to a third party, the method comprising:

providing a database wherein the electronic file and customer identification information are stored with a storage electronic postmark;

receiving from a customer a link request to permit access of the electronic file by the third party, wherein the link request includes information identifying the electronic file in the database, the customer identification information including the customer's digital certificate, and the third party's digital certificate;

authenticating the customer based on the customer identification information;

linking the customer's digital certificate to the third party's digital certificate, when the customer has been authenticated;

receiving an access request from the third party, wherein the access request includes identification information about the third party and the information identifying the electronic file in the database;

verifying that the third party may access the electronic file based on identification information about the third party;

retrieving the electronic file from the database; and providing the retrieved electronic file to the third party.

26. The method of claim 25, wherein the customer identification information further includes a name and password.

27. The method of claim 25, wherein the identification information about the third party includes the third party's digital certificate.

28. The method of claim 27, wherein the identification information about the third party further includes a name and password.

29. The method of claim 25, further comprising:

creating a link request electronic postmark corresponding to the link request; and storing the link request electronic postmark in the database.

30. The method of claim 25, further comprising:

creating an access request electronic postmark corresponding to the access request; and storing the access request electronic postmark in the database.

31. The method of claim 25, further comprising:

creating an access electronic postmark corresponding to the retrieval of the electronic file; and storing the access electronic postmark in the database.

32. The method of claim 25, wherein the information identifying the electronic file in the database includes a filename.

33. The method of claim 25, wherein the step of retrieving the stored electronic file from the database comprises:

extracting the stored electronic file from the storage electronic postmark.

34. A system for providing access to a secured electronic file to a third party, the system comprising:

means for providing a database wherein the electronic file and customer identification information are stored with a storage electronic postmark;

means for receiving from a customer a link request to permit access of the electronic file by the third party, wherein the link request includes information identifying the electronic file in the database, the customer identification information including the customer's digital certificate, and the third party's digital certificate;

means for authenticating the customer based on the customer identification information;

means for linking the customer's digital certificate to the third party's digital certificate, when the customer has been authenticated;

means for receiving an access request from the third party, wherein the access request includes identification information about the third party and the information identifying the electronic file in the database;

means for verifying that the third party may access the electronic file based on identification information about the third party;

means for retrieving the electronic file from the database; and means for providing the retrieved electronic file to the third party.

35. The system of claim 34, further comprising:

means for creating a link request electronic postmark corresponding to the link request; and means for storing the link request electronic postmark in the database.

36. The system of claim 34, further comprising:

means for creating an access request electronic postmark corresponding to the access request; and means for storing the access request electronic postmark in the database.

37. The system of claim 34, further comprising:

means for creating an access electronic postmark corresponding to the retrieval of the electronic file; and means for storing the access electronic postmark in the database.

38. The system of claim 34, wherein the means for retrieving the stored electronic file from the database comprises:

means for extracting the stored electronic file from the storage electronic postmark.

39. A system for providing access to a secured electronic file to a third party, the system comprising:

a component for providing a database wherein the electronic file and customer identification information are stored with a storage electronic postmark;

a component for receiving from a customer a link request to permit access of the electronic file by the third party, wherein the link request includes information identifying the electronic file in the database, the customer identification information including the customer's digital certificate, and the third party's digital certificate;

a component for authenticating the customer based on the customer identification information;

a component for linking the customer's digital certificate to the third party's digital certificate, when the customer has been authenticated;

a component for receiving an access request from the third party, wherein the access request includes identification information about the third party and the information identifying the electronic file in the database;

a component for verifying that the third party may access the electronic file based on identification information about the third party;

a component for retrieving the electronic file from the database; and a component for providing the retrieved electronic file to the third party.

40. The system of claim 39, further comprising:

a component for creating a link request electronic postmark corresponding to the link request; and a component for storing the link request electronic postmark in the database.

41. The system of claim 39, further comprising:

a component for creating an access request electronic postmark corresponding to the access request; and a component for storing the access request electronic postmark in the database.

42. The system of claim 39, further comprising:

a component for creating an access electronic postmark corresponding to the retrieval of the electronic file; and a component for storing the access electronic postmark in the database.

43. The system of claim 39, wherein the component for retrieving the stored electronic file from the database comprises:

a component for extracting the stored electronic file from the storage electronic postmark.

44. A method for creating a customer accessible database, comprising:

creating a first table for storing electronic postmark transactions;

storing the electronic postmark transactions in the first table;

creating a second table for storing an electronic file with a storage electronic postmark and;

storing the electronic file with the storage electronic postmark in the second table.

45. The method of claim 44, wherein the electronic postmark transactions include at least one of storage request electronic postmark, access request electronic postmark, access electronic postmark, link request electronic postmark, link electronic postmark, and customer identification information.

46. The method of claim 45, wherein the customer identification information includes a digital certificate.

47. The method of claim 46, wherein the customer identification information further includes a name and password.

48. A system for creating a customer accessible database, comprising:

means for creating a first table for storing electronic postmark transactions;

means for storing the electronic postmark transactions in the first table;

means for creating a second table for storing an electronic file with a storage electronic postmark and;

means for storing the electronic file with the storage electronic postmark in the second table.

49. A method for accessing a customer accessible database having at least one of storage electronic postmark, storage request electronic postmark, access request electronic postmark, access electronic postmark, link request electronic postmark, link electronic postmark, and customer identification information, the system comprising:

creating a record including at least one of storage electronic postmark, storage request electronic postmark, access request electronic postmark, access electronic postmark, link request electronic postmark, and link electronic postmark;

storing the record in the database; and retrieving the record from the database.

50. The method of claim 49, further comprising extracting an electronic file from the retrieved record that includes the storage electronic postmark.

51. A system for accessing a customer accessible database having at least one of storage electronic postmark, storage request electronic postmark, access request electronic postmark, access electronic postmark, link request electronic postmark, link electronic postmark, and customer identification information, the system comprising:

means for creating a record including at least one of storage electronic postmark, storage request electronic postmark, access request electronic postmark, access electronic postmark, link request electronic postmark, and link electronic postmark;

means for storing the record in the database; and means for retrieving the record from the database.

52. The system of claim 51, further comprising means for extracting an electronic file from the retrieved record that includes the storage electronic postmark.

* * * * *